3,439,076
PROCESS FOR PREPARING CONCRETE TILES HAVING A TOP LAYER OF EPOXY RESIN
Hendrikus J. Loois, Delft, Netherlands, assignor to Shell Oil Company, New York, N.Y., a corporation of Delaware
No Drawing. Filed Nov. 9, 1966, Ser. No. 593,003
Claims priority, application Netherlands, Nov. 15, 1965, 6514788
Int. Cl. B28b 1/08, 1/04
U.S. Cl. 264—69     12 Claims The invention relates to a process for the manufacture of articles comprising a surface layer with an organic plastic material as binder and a cement-containing (for example concrete) base layer, and to the articles thus manufactured.

Britain Patent No. 758,615 discloses a process for the manufacture of such articles, wherein a layer of liquid thermosetting resin (for example a mixture of epoxy resin and curing agent) is applied on or in a mold, and wherein irregularly-shaped pieces of hard, porous material are subsequently partially embedded in this layer; the resin is then allowed to cure by chemical reaction and a supporting layer of wet concrete or plaster is applied which is subsequently allowed to harden. The pieces of irregularly shaped material which are situated partly in the resin layer and partly in the concrete layer ensure that the two layers firmly bonded together, and are essential in the said process since wet concrete adheres very poorly to already cured epoxy resin. A disadvantage of this method is the double curing time which renders it particularly unattractive for series manufacture.

It is also known that a liquid mixture of epoxy resin and curing agent adheres excellently to freshly poured concrete and that on simultaneous cure a very firm bond is obtained; it has therefore been proposed to manufacture concrete articles having a plastic top layer by first placing a liquid layer of epoxy resin and curing agent in a mold and pouring concrete onto the layer immediately afterwards, whereupon the whole is allowed to cure simultaneously.

A drawback of the latter method is that the concrete upon being tamped or vibrated will penetrate, i.e., that the concrete suspension (which has a higher density than the epoxy resin mixture) sags out into the underlying top layer in an irregular manner, sometimes down into the bottom of the mold, as a result of which bulges in the concrete are often clearly visible through the surface layer after the article has been cured and removed from the mold. An irregularity of this type in the thickness of the top layer is undesirable, since epoxy resin top layers are particularly used because of their excellent resistance to solvents and chemicals such as acids, and since less resistant spots occur when the concrete penetrate. In order to avoid penetration of the concrete attempts have also been made to effect a partial cure of the epoxy resin layer by reacting it with the curing agent. Only then is the concrete poured onto it. A drawback is that a double hardening time is again required, which is undesirable for series manufacture, while in addition the concrete adheres less satisfactorily to partially cured epoxy resin.

A process has now been found for the manufacture of articles having a plastic top layer and a concrete base layer with simultaneous curing of the two layers, in which process a liquid layer comprising an epoxy resin and a curing agent is first applied in a mold and concrete is poured onto said layer before the resin is cured, characterized in that the layer applied in the mold and comprising epoxy resin and curing agent is cooled by at least 30° C., fresh concrete then being poured on it and both layers being subsequently cured simultaneously.

As a result of this cooling the viscosity of the still liquid top layer will be such that even when the concrete is being tamped or vibrated there will be no penetration. Even during the simultaneous curing of the concrete and the epoxy resin layer no penetration occurs. In the novel process, the adhesion of the two layers is excellent; in tensile tests to break it was found that break invariably occurs in the concrete, which means, therefore, that the adhesion of the two layers is greatest than the cohesion of the concrete.

When using curing agents which cure at the lower temperatures, the simultaneous curing may be carried out at room temperature or, to accelerate production, at elevated temperature, for example, between 70 and 150° C. When using curing agents an elevated temperature is invariably used, for example, between 70 and 150° C.

By epoxy resin is meant an epoxy compound or a mixture of epoxy compounds having an average of more than one epoxy group per molecule. The epoxy compounds used are preferably polyglycidyl ethers of polyhydric phenols, such as polyglycidyl ethers of 2,2-bis(4-hydroxyphenyl)-propane, bis(4-hydroxyphenyl)-methane, 1,1-bis-(4-hydroxyphenyl)-ethane, resorcinol, novolacs and resols, or mixtures thereof. Particularly preferred are diglycidyl ethers of 2,2-bis(4-hydroxyphenyl)-propane (such as may be obtained for example by reacting 2,2-bis(4-hydroxyphenyl)-propane with epichlorohydrin under the action of alkali metal hydroxide) and mixtures thereof, with at most 40% by weight of a liquid monoepoxide such as butyl glycidyl ether, phenyl glycidyl ether, furfuryl glycidyl ether, glycidyl ethers of monohydric alcohols with 10–20 carbon atoms per molecule and glycidyl esters of saturated aliphatic monocarboxylic acids in which the carbon atoms of the carboxyl group is bound to a tertiary or quaternary carbon atom. When a hot-curing agent is employed with mixtures of this type, use can advantageously be made of polyglycidyl ethers of 2,2-bis(4-hydroxyphenyl)-propane having an epoxy equivalent weight of 450–550; polyglycidyl ethers of this type are solid at room temperature and soften at temperatures above 60° C.

The curing agents used may be amino compounds such as piperidine, diethylene triamine, 2,4,6 - tri(dimethyl aminomethyl)phenol and salts thereof, such as a salt of the latter amine and 2-ethyl-hexanoic acid, polyamino amides derived from mono and polycarboxylic acids and polyamines, and polymercapto compounds, as well as mixtures, for example, of amides or polymercapto compounds with 2,4,6-tri(dimethyl aminomethyl)phenol.

It is preferred to use hot-curing curing agents, such as piperidine and a 2-ethyl-hexanoic acid salt of 2,4,6-tri(dimethyl aminomethyl)phenol, one of the reasons being the very good adhesion of epoxy resin layer and concrete layer which results.

Dyes, pigments, fillers such as sand, quartz powder, alumina and carborundum may be added to the liquid mixture of epoxy resin and curing agent. In order to obtain a non-slip and wear-resistant top layer (for example, for the manufacture of tiles) the said fillers are preferably used in amounts of from 1 to 5 times the weight of the mixture of epoxy resin and curing agent.

The mold in which the articles according to the invention are prepared is preferably made from a material having a good heat conductivity, such as metal, for example, iron or aluminum.

In this mold a thin layer of mold release agent, such as wax or silicones may be applied in order to prevent the article from sticking to the mold. It is also possible to apply in the mold a film of polyethylene or preferably of polypropylene, which also prevents the article from sticking to the mold. These films can also be readily removed from the cured article.

Subsequently, a layer of epoxy resin and curing agent is applied in the mold, for example, by casting, spreading or trowelling (if a large quantity of filler is present) in a layer which is preferably between 1 and 5 mm. thick. Mixtures which only cure at elevated temperature may be introduced into the mold at elevated temperature, for for example, at 70–80° C., after which the mold containing the epoxy resin layer is cooled, for example, by external cooling to room temperature by means of water. Mixtures which already cure at room temperature, are preferably introduced into the non-preheated mold at room temperature, cooling being subsequently effected to, for example, −10° C. in, for instance, a mixture of ice and salt, in deeply cooled solutions of salts, in a cooler with solid carbonic acid and the like.

The concrete is then poured onto the cooled epoxy resin layer and compacted by tamping or vibrating to the desired layer thickness. The article is thereupon allowed to cure in the mold, if desired at elevated temperature, for instance in an oven, and is then removed from the mold.

The process of the invention can be used for the manufacture of articles of various shapes, such as tiles, panels, building blocks, shower floors, sinks, table tops in workshops and laboratories, kitchen slabs and the like.

The invention is now illustrated by some examples. The concrete had the following composition:

| | Parts by volume |
|---|---|
| Gravel | 3 |
| River sand | 2 |
| Cement | 1 |
| Water | ½ |

Polyether A was a liquid plyglycidyl ether of 2,2-bis(4-hydroxyphenyl)-propane having an epoxy equivalent weight of 200, an average molecular weight of 350 and a viscosity of 150 poises at 25° C.

Polyether D was a polyglycidyl polyether of 2,2-bis(4-hydroxyphenyl)-propane having an epoxy equivalent weight of 500, an average molecular weight of 900 and a Durrans' mercury softening point of 70° C.

Glycidyl ester E was a mixture of glycidyl esters of saturated aliphatic monocarboxylic acids containing 9–11 carbon atoms per molecule and in which the carbon atoms of the carboxyl groups were bound to tertiary and quaternary carbon atoms.

Curing agent A was 2,4,6-tri(dimethyl aminomethyl) phenol.

Curing agent B was a salt of curing agent A and 2-ethylhexanoic acid.

Curing agent C was a polyamino amide of aliphatic polyamine and polycarboxylic acids with amine number of 425 and a viscosity of 6 poises at 25° C., commercially available as "Genamid" 250 ("Genamid" is a registered trademark).

Unless otherwise stated, the parts referred to in the examples are parts by weight. The mold used in the examples was a metal tray, 20 cm. long, 20 cm. wide and 5 cm. high. Bottom and walls were covered with polypropylene film as mold release agent.

Example I

A mixture consisting of:

| | Parts |
|---|---|
| Polyether A | 85 |
| Glycidy ester E | 15 |
| Curing agent B | 12 |
| River sand | 300 |
| Quartz powder, 140 mesh | 100 | was spread evenly in the heated mold at 70–80° C. in a layer thickness of 1 mm. The mold was then cooled to room temperature with water. The mold was thereupon completely filled with the above concrete mixture. The mold containing the "wet" title was subsequently placed in an oven and kept at 80° C. for 2 hours. After cooling the cured tile was removed from the mold.

Example II

Example I was repeated except that the epoxy resin mixture had the following composition:

| | Parts |
|---|---|
| Polyether A | 33 |
| Polyether D | 33 |
| Glycidyl ester E | 33 |
| Curing agent B | 10 |
| River sand | 300 |
| Quartz powder, 140 mesh | 100 |

Example III

Example I was repeated except that the epoxy resin mixture had the following composition:

| | Parts |
|---|---|
| Polyether D | 75 |
| Glycidyl ester E | 25 |
| Curing agent B | 7 |
| River sand | 300 |
| Quartz powder, 140 mesh | 100 |

Example IV

The Examples I, II and III were repeated except that instead of the Curing agent B 5 parts of piperidine were used and that the molds containing the "wet" tiles were kept at 100° C. for 5 hours.

Example V

A mixture of:

| | Parts |
|---|---|
| Polyether A | 85 |
| Glycidyl ester E | 15 |
| Curing agent C | 60 |
| Curing agent A | 5 |
| River sand | 618 |
| Quartz powder, 140 mesh | 206 | was spread in the mold at room temperature in a layer thickness of 1 mm.

The mold was then cooled to −10° C. and subsequently filled competely with the above-mentioned concrete mixture.

The tile was thereupon cured in the mold at room temperature for 48 hours and removed from the mold.

Example VI

The tiles manufactured according to the Examples I–V were examined for appearance, uniformity of the epoxy resin top layer and adhesion of this layer to the concrete.

All tiles had a uniform, rough surface; no concrete penetration could be observed with the naked eye.

The tiles were then fractured. The fractures showed a uniform thickness of the epoxy resin layer. No fractures occurred in the boundary layer.

I claim as my invention:

1. In a process for the manufacture of articles having a plastic top layer and a concrete base layer with simultaneous curing of the two layers, in which process a liquid layer containing an epoxy resin and a curing agent is first applied in a mold and concrete is poured onto said layer and is compacted before the resin is cured, the improvement which comprises cooling by at least 30° C. the layer applied in the mold and containing epoxy resin and curing agent, fresh concrete being then poured on it and both layers being substantially cured simultaneously.

2. A process as claimed in claim 1, characterized in that the epoxy resin used is a polyglycidyl ether of 2,2-bis-(4-hydroxyphenyl)propane.

3. A process as claimed in claim 1, characterized in that the epoxy resin used is a mixture of at least 6 parts by weight of a polyglycidyl ether of 2,2-bis(4-hydroxyphenyl)propane and at most 4 parts by weight of a liquid monoglycidyl compound.

4. A process as claimed in claim 3, characterized in that a polyglycidyl ether of 2,2-bis(4-hydroxyphenyl)propane with an epoxy equivalency weight of 450–550 is used.

5. A process as claimed in claim 4, characterized in that the monoglycidyl compound used is a glycidyl ester of saturated aliphatic monocarboxylic acids wherein the carbon atom of the carboxyl group is bound to a tertiary or quaternary carbon atom.

6. A process as claimed in claim 1, characterized in that a curing agent which is only active at elevated temperature above 60° C.

7. A process as claimed in claim 6, characterized in that the curing agent used is a salt of 2,4,6-tri(dimethyl aminomethyl)phenol and 2-ethyl-hexanoic acid.

8. A process as claimed in claim 6, characterized in that the curing agent used is piperidine.

9. A process as claimed in claim 1, characterized in that the curing agent used is a polyamino amide derived from a polyamine and a carboxylic acid.

10. A process as claimed in claim 1, characterized in that the mixture containing epoxy resin and curing agent is applied in the mold at a temperature above 70° C. and is subsequently cooled to room temperature.

11. A process as claimed in claim 1, characterized in that both layers are simultaneously cured at elevated temperature.

12. A process as claimed in claim 1, characterized in that the curing temperature is between 70 and 150° C.

References Cited

UNITED STATES PATENTS

| | | | |
|---|---|---|---|
| 2,954,301 | 9/1960 | Szukiewicz. | |
| 3,246,057 | 4/1966 | Simonson. | |
| 2,921,463 | 1/1960 | Goldfein | 52—309 |
| 3,198,758 | 8/1965 | Donnelly | 264—256 |

ROBERT F. WHITE, *Primary Examiner.*

R. SHEAR, *Assistant Examiner.*

U.S. Cl. X.R.

264—256; 52—309